United States Patent [19]

Thacker

[11] Patent Number: 5,193,197
[45] Date of Patent: Mar. 9, 1993

[54] APPARATUS AND METHOD FOR DISTRIBUTED DYNAMIC PRIORITY ARBITRATION FOR ACCESS TO A SHARED RESOURCE

[75] Inventor: Charles P. Thacker, Palo Alto, Calif.

[73] Assignee: Digital Equipment Corporation, Maynard, Mass.

[21] Appl. No.: 576,177

[22] Filed: Aug. 30, 1990

Related U.S. Application Data

[63] Continuation of Ser. No. 100,533, Sep. 24, 1987, abandoned.

[51] Int. Cl.⁵ .................................................. G06F 13/14
[52] U.S. Cl. ............................... 395/725; 364/DIG. 1; 364/242.6; 364/242.8; 364/240; 364/242.92; 364/242.93
[58] Field of Search ... 364/200 MS File, 900 MS File; 395/725, 325

[56] References Cited

U.S. PATENT DOCUMENTS

| | | | |
|---|---|---|---|
| 3,593,300 | 7/1971 | Driscoll, Jr. et al. | 364/200 |
| 3,983,540 | 9/1976 | Keller et al. | 364/200 |
| 4,096,571 | 6/1978 | Vander Mey | 364/200 |
| 4,229,791 | 10/1980 | Levy et al. | 364/200 |
| 4,232,294 | 11/1980 | Burke et al. | 364/200 |
| 4,257,095 | 3/1981 | Nadir | 364/200 |
| 4,321,669 | 3/1982 | Macmillan | 364/200 |
| 4,451,881 | 5/1984 | Grice et al. | 364/200 |
| 4,467,418 | 8/1984 | Quinquis | 364/200 |
| 4,511,959 | 4/1985 | Nicolas et al. | 364/200 |
| 4,628,447 | 12/1986 | Cartret et al. | 364/200 |
| 4,633,394 | 12/1986 | Georgiou et al. | 364/200 |
| 4,644,467 | 2/1987 | McCarthy | 364/200 |
| 4,785,394 | 11/1988 | Fischer | 364/200 |
| 4,839,800 | 6/1989 | Barlow et al. | 395/725 |
| 4,907,149 | 3/1990 | Gula et al. | 395/725 |
| 5,025,370 | 6/1991 | Koegel et al. | 395/725 |

*Primary Examiner*—Kevin A. Kriess
*Attorney, Agent, or Firm*—A. Sidney Johnston; Ronald E. Myrick; Barry N. Young

[57] ABSTRACT

In a data processing system in which resource units are shared by a plurality of processing units, an arbitration unit is disclosed wherein the priority assigned to each processing unit is dynamically assigned to equalize accessibility to the shared resource. A signal path, associated with each possible level of priority, is coupled to each processor unit. The processor unit applies an activation signal to the signal line associated with the priority of the processing unit when the processing unit has a requirement for the shared resource and an arbitration is being performed to determine access to the resource. During the arbitration procedure, each processing unit requiring access to the shared resource compares the current priority of the associated processing unit to the activation signals on the signal paths to determine when the processing unit can gain access to the shared resource. After the arbitration procedure, the processing unit priority level is redetermined by each processing unit based on a comparison of the current priority level and the highest priority level active during arbitration.

43 Claims, 3 Drawing Sheets

APPARATUS AND METHOD FOR DISTRIBUTED DYNAMIC PRIORITY ARBITRATION FOR ACCESS TO A SHARED RESOURCE

This is a continuation of copending application Ser. No. 07/100,533 filed on Sep. 24, 1987, now abandoned.

BACKGROUND OF THE INVENTION

1. Field of the Invention

This invention relates generally to data processing systems and, more particularly, to data processing systems in which a plurality of processing units share system resources. When a plurality of processing units have a requirement for a shared resource, a method of assigning the resource unit to a processing unit must be provided, typically in the form of arbitration apparatus and procedures.

2. Description of the Related Art

A common type of data processing system architecture is to provide the data processing system having a plurality of central processing units with at least one shared resource. In a bus-oriented data processing system, the shared resource is the system bus over which the central processing units communicate with a main memory unit, input/output units, etc. Similarly, the main memory unit, the input/output units or other subsystems can have a requirement of access to the system bus. Each subsystem that can have a requirement for access to the system bus (or shared resource in the general data processing system architecture) will be referred to as a processing unit. In the data processing system in which the subsystems of the data processing unit are coupled by means of an electronic switch, sometimes referred to as the system interface unit, a plurality of central processing units can attempt to gain access to the same shared resource (i.e., main memory unit, input/output units, etc.). The input/output units can similarly have a requirement to gain access to a memory unit and, indeed, central processing units can have a requirement to gain access to another central processing unit. A decision process for determining the appropriate access to a shared resource must be provided. In a data processing system, such a process is generally referred to as an arbitration process.

One of the problems associated with the arbitration procedure is that access to the shared resource can be more important for certain processing units. To accommodate this difference in importance, priorities can be assigned to each processing unit and the processing unit with a requirement for access to the shared resource and having the highest priority can acquire the access to the shared resource. However, a conflicting requirement is that access to the shared resource must be equitably distributed. Otherwise, the processing unit with the highest priority can monopolize the shared resource. The allocation of access to the system bus is critical to the successful operation of the data processing system, the allocation being the mechanism by which each subsystem provides and receives data.

A need has therefore existed for apparatus and method for an arbitration technique that can dynamically reassign priority levels to each processing unit after an arbitration event, the reassignment being performed by each processing unit.

FEATURES OF THE INVENTION

It is an object of the present invention to provide an improved data processing system.

It is a feature of the present invention to provide an improved data processing system in which processing units share system resources.

It is another feature of the present invention to provide a dynamic arbitration in a data processing system in which processing units share resources.

It is yet another feature of the present invention to provide a dynamic arbitration apparatus that is distributed throughout the data processing system.

It is yet another feature of the present invention to provide arbitration apparatus in a data processing system that equitably distributes the access to a shared resource among a plurality of subsystems requiring access to the shared resource.

It is yet another feature of the present invention to provide a dynamic and distributed arbitration apparatus for a data processing system in which at least one data processing subsystem can have an arbitrary priority level assigned thereto.

SUMMARY OF THE INVENTION

The aforementioned and other features are accomplished, according to the present invention, by providing, in a data processing system in which a plurality of processing units can have a requirement of access to a shared resource, arbitration apparatus associated with each processing unit for responding to a REQUEST signal from the associated processing unit and providing a GRANT signal to the associated processing unit when access to the shared resource is permitted. Each arbitration apparatus has a priority level that is unique with respect to other competing processing units. Associated with each priority level is a signal path coupled to each arbitration apparatus. When a REQUEST signal is made by a processing unit to the associated arbitration apparatus, the arbitration apparatus activates the signal path associated with the processing unit's priority level. Because each arbitration apparatus has available the priority of the associated processing unit and the priority level of all the processing units requesting access to the shared resource, then the processing unit with the highest priority level receives the GRANT signal from the associated arbitration apparatus. After the GRANT signal has been generated, all of the arbitration units can redetermine the priority level of the associated processing unit.

These and other features of the present invention will be understood upon reading of the following description along with the drawings.

DESCRIPTION OF THE PREFERRED EMBODIMENT

1. Detailed Description of the Figures

Figure 1:
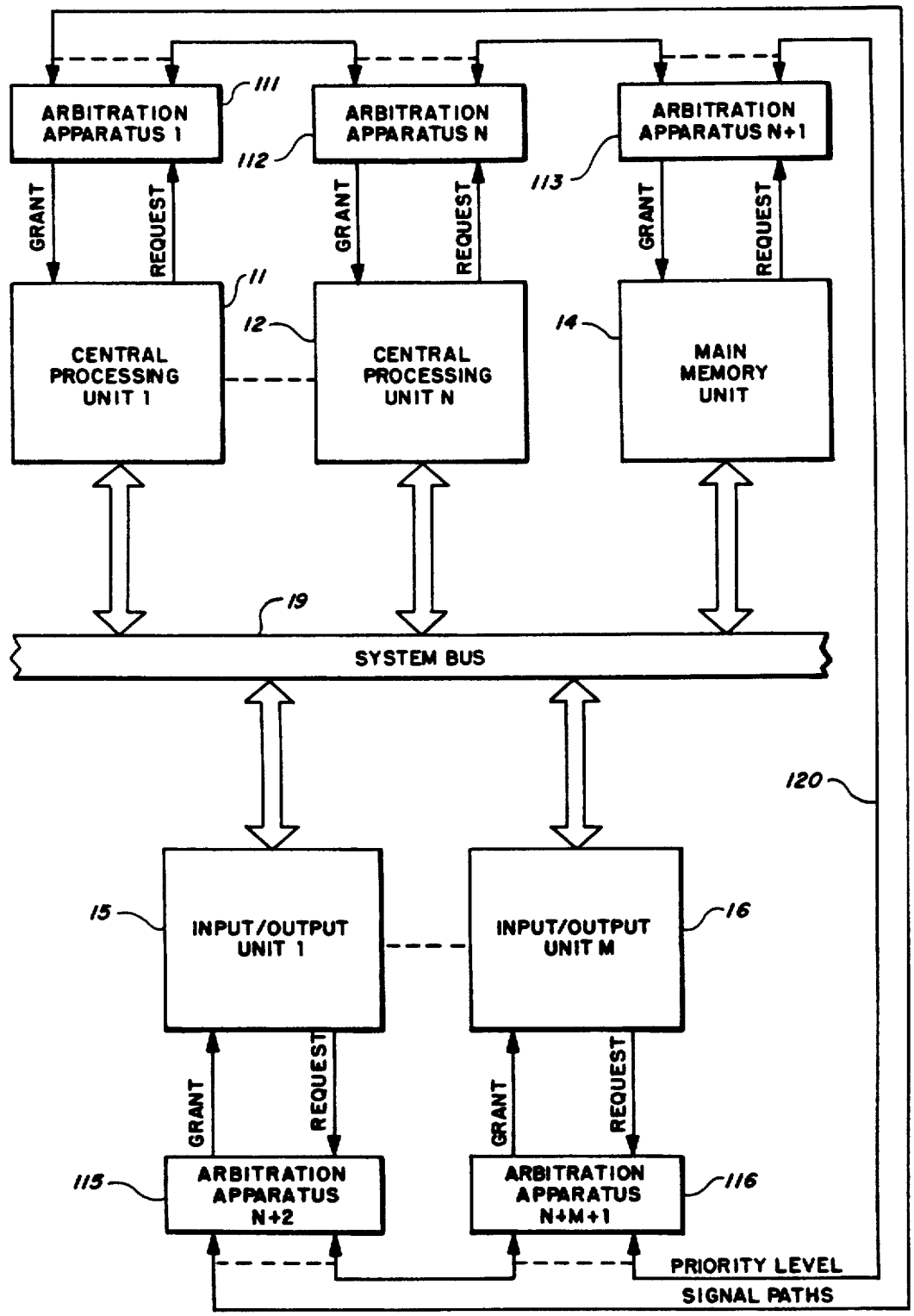
FIG. 1 is a block diagram of a bus-oriented data processing system illustrating the associated arbitration apparatus and the signal paths transferring information.

Referring now to FIG. 1, a block diagram of a bus-oriented data processing system including the present invention is shown. The data processing system includes a system bus 19, central processing unit 11 through central processing unit 12, a main memory unit 14 and a plurality of input/output units 15-16. The central processing units 11-12 manipulate data and program information. The main memory unit 14 stores data and program information to be used by the central processing units 11-12. The input/output units 15-16 couple the data processing system to peripheral units, to communication devices, to mass storage devices, etc. Each of these data processing system subsystems can require access to the system bus 19 to transfer data information, control information and program information thereon. The present invention includes the addition of arbitration apparatus 111-116 associated with each subsystem, i.e., arbitration apparatus 111 is associated with central processing unit 11, etc. The arbitration apparatus receives a REQUEST signal from the associated subsystem or processing unit when the processing unit has a requirement for access to the system bus 19. When the arbitration apparatus determines that the associated processing unit is to receive access to the system bus 19, a GRANT signal is applied by the arbitration apparatus to the associated processing unit. A priority signal bus 120, having a signal path associated with each level of priority, has each signal path coupled to each arbitration apparatus. The number of priority level signal paths will therefore be at least as great as the number of processing units requiring access to the system bus (i.e., shared resource).

Figure 2:
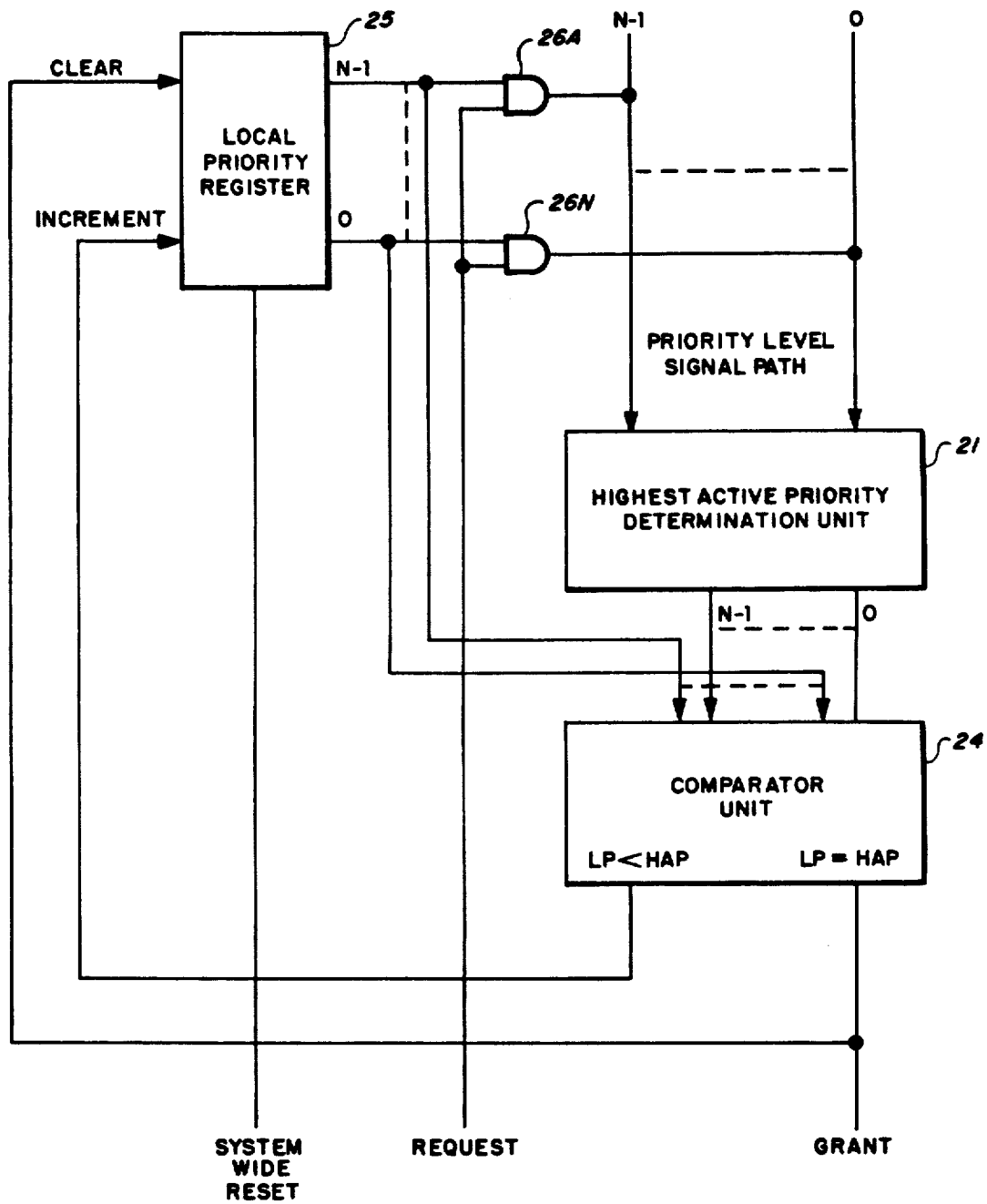
FIG. 2 is a block diagram of the principal components of each arbitration apparatus unit.

Referring next to FIG. 2, a block diagram of the principal components of an arbitration apparatus 111 is shown. The priority level signal paths 0 through N−1 are applied to the highest active priority determination unit 21. The highest active priority determination unit 21 determines which of the priority signal paths has the highest active signal asserted thereon. Because each priority signal path has a priority level assigned thereto, this determination identifies the highest active priority level. The local priority register 25 has a logic signal stored in a register position associated with the priority of the associated processing unit. After initialization, the contents of register 25 are determined by a comparator unit 24 as a result of an arbitration activity. The contents of register 25 and the highest active priority determination unit 21 are compared by comparator unit 24. When the result of this comparison is that the contents of register 25 are equal to the output signal of the highest active priority determination unit 21, then the GRANT signal is asserted for the associated processing unit. This GRANT signal is applied to local priority register 25 for clearing the contents of the local priority register 25, i.e., the register 25 indicating that the associated register has the lowest priority. When the result of the operation of comparator unit 24 is that the contents of local priority register 25 are less than the output signal of the highest active priority determination unit 21, (i.e., the local priority level is lower than the highest active priority level), a signal is applied to local priority register 25 which results in incrementing the level register 25 (i.e., raising the priority level of the associated processing unit by one level). Between each priority level position of local priority register 25 and the associated signal path, a logic AND gate 26A through 26N is interposed. Each logic AND gate receives the REQUEST signal at a second terminal thereof. The presence of the REQUEST signal will cause an active signal to be asserted on the priority signal level path associated with the local priority level.

The purpose of the system-wide reset signal applied to the local priority register 25 is to initialize each arbitration unit in the system to a unique priority level.

Figure 3:
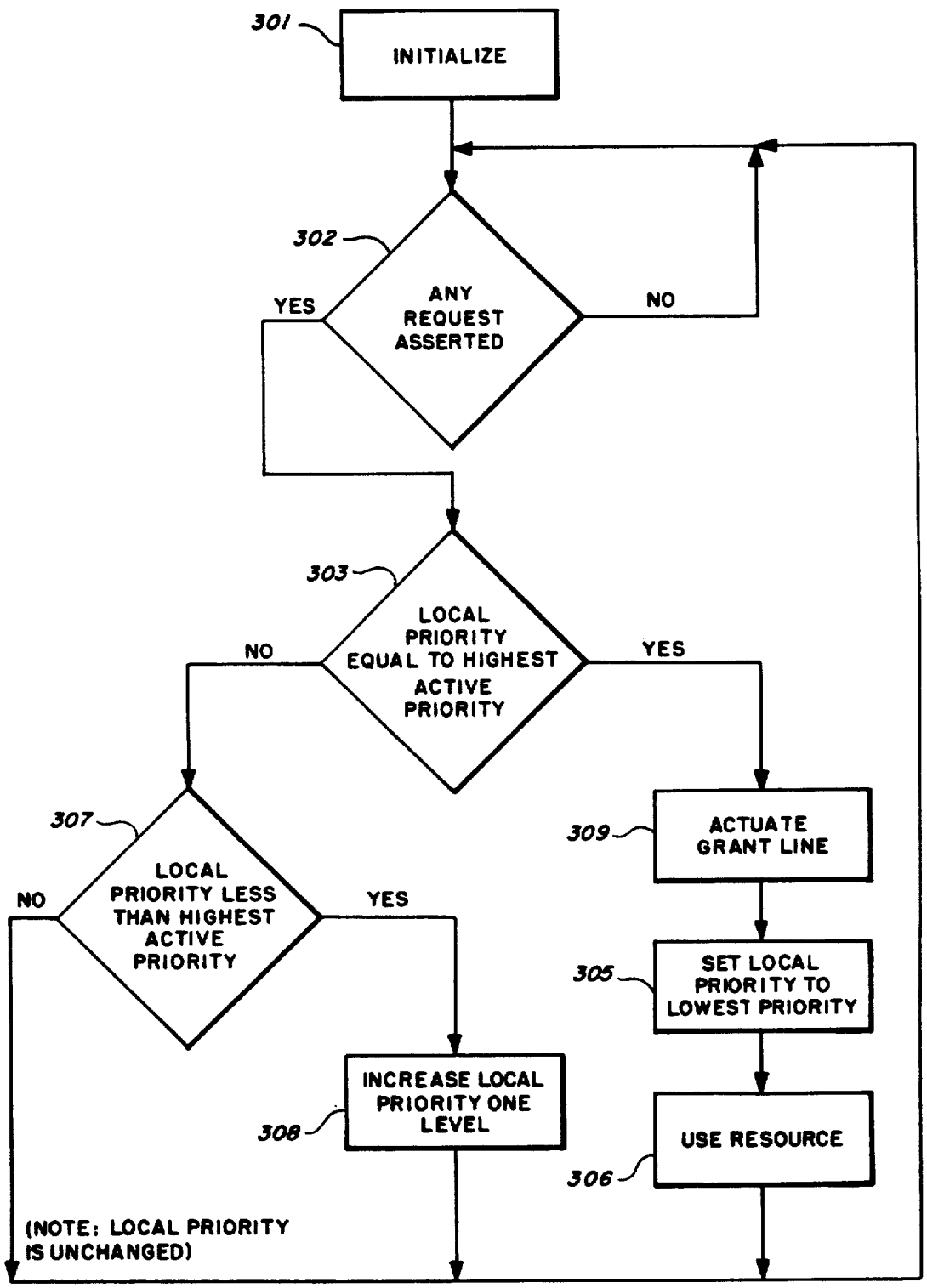
FIG. 3 is a flow diagram illustrating the determination of the GRANT signal and the subsequent priority level redetermination.

Referring next to FIG. 3, the procedure followed by each arbitration apparatus is illustrated. In step 301, the data processing system is initialized so that each processing unit has a unique priority level associated therewith. In step 302, a REQUEST signal from any processing unit initiates the arbitration process. When an arbitration unit receives a REQUEST signal from its associated processing unit, the priority signal path associated with the priority level will be activated. Because each processing unit has unique priority, only one arbitration apparatus can activate a particular signal path. In step 303, a determination is made whether the local priority level is the highest active priority level. When the local priority level is the highest priority level, then a GRANT signal is applied to the associated processing unit in step 304 and the associated processing unit can interact with the system bus (or shared resource). In step 305, the local priority level is changed from the current level to the lowest possible priority level, i.e., "0". In step 306, the shared resource is accessed by the processing unit with the highest priority level. When the access of the resource unit is complete, the process is continued by entering step 302. When the local priority level is not the highest active level in step 303, then a determination is made whether the local priority level is higher than the highest active level in step 307. When the local priority level is higher than the highest active priority level as determined from the activated signal paths, then the arbitration apparatus does nothing further and enters step 302. When the local priority level is less than the highest active priority level in step 307, then, in step 308, the local priority level is increased to one greater priority level than the current priority level. Although each step is shown in FIG. 3 as a separate entity, in the preferred embodiment, the arbitration process proceeds with parallel operations and each arbitration process requires a single clock cycle.

2. Operation of the Preferred Embodiment

The procedure for redetermination or up-dating the local priority level involves assigning the processing unit acquiring access to the shared system resource with the lowest priority and incrementing by one the priority levels of the processing units having a lower priority than the acquiring processing unit. The algorithm for this procedure, illustrated in FIG. 3, can be described by the following Pascal procedure:

```
*****
TYPE Priority [0..N-1];
VAR P: Priority; (* the current priority of the
requester*)
Request, Grant: BOOLEAN; (* the signals into and
out of the arbitration unit *)
PROCEDURE Assert (p: Priority); (* drives the
priority signal path
corresponding to the current
value of p *)
PROCEDURE Pri(): Priority; (* returns the priority
corresponding to the current
state of the priority signal
paths. Returns zero if no
priority signal path is
asserted *)
BEGIN LOOP (* once per cycle *)
```

-continued

```
IF Request Then Assert (P); END;
IF Pri() > P THEN
    Grant := FALSE;
    P := P+1; (* Another unit won the
    arbitration. Increment P *)
ELSEIF Request THEN
    Grant := TRUE
    P := 0; (* local arbitration apparatus
    acquires access to shared
    resource. Set P = 0 and
    assert Grant *)
ELSE Grant := FALSE
END
END
END
*****
```

In the disclosed embodiment, the synchronization of the arbitration apparatus with each other and with the remainder of the data processing system has not been indicated. It will be clear that such synchronization can be achieved by a multiplicity of functionally equivalent techniques involving timing and/or control signals.

It will be clear that the dynamic priority arbitration of the present invention can accommodate a number of variations that depart from the preferred embodiment implementation described above. As an example, in any data processing system, one processing unit can be so important as to be afforded the top priority level when ever access to a shared resource is attempted. In this situation, only the arbitration apparatus associated with the highest priority processing unit can activate the signal path associated with the highest priority level. Similarly, any arbitrary priority level can be assigned to a processing unit, the incrementing of the local priority register of arbitration apparatus to which the priority level has not been assigned not being incremented when a signal path having the assigned priority level is activated.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processing system comprising:
   a plurality of processing units;
   at least one shared resource;
   a plurality of arbitration means, each arbitration means associated with a processing unit and exchanging signals therewith, said arbitration means for determining a priority of said associated processing unit;
   a priority signal but having a signal path for each level of priority available to said processing units, all signal paths being coupled to all arbitration means, wherein each arbitration means applies a priority signal to a signal path related to a level of priority of said associated processing unit when a first signal is applied to an arbitration means by said associated processing unit, each arbitration means including comparator means coupled to said priority signal bus for applying a second signal to said associated processing unit when said arbitration means priority signal identifies a highest priority of all priority signals applied to said priority signal bus as corresponding to an indicia of priority of said processing unit; and,
   up-date means for incrementing said indicia of a priority of said processing unit, said indicia increased upon access by any of said plurality of processing units to said shared resource, and a last processing unit having access to said at least one shared resource having an associated indicia of priority set to a lowest priority.

2. The data processing system of claim 3 wherein first signal is a REQUEST signal by said associated processing unit requesting access to said shared resource.

3. The data processing system of claim 1 wherein said priority redetermination means increases by one each priority level less than said highest priority level and sets said housing priority to a lowest priority level.

4. The data processing system of claim 2 wherein said second signal applied to said associated processing unit permits said associated processing unit to access said shared resource.

5. The data processing system of claim 4 wherein a processing unit associated with an arbitration means can have a preselected arbitrary priority level assigned thereto.

6. The data processing unit of claim 4 wherein said shared resource is a system bus coupling said plurality of processing units.

7. The data processing unit of claim 6 wherein said second signal can be applied to a processing unit during consecutive timing cycles of said data processing system.

8. The data processing system of claim 4 wherein each of said arbitration means include initialization means responsive to an initialization signal for assigning an initial level of priority to each processing unit associated with said each arbitration means.

9. An arbitration unit for providing distributed dynamic arbitration for access to a shared resource in a synchronous data processing system, each arbitration unit being associated with a data processing system subsystem requiring access to said shared resource, wherein said data processing system includes a priority signal bus having a signal path related to each level of priority, said arbitration unit comprising:
   determination means coupled to said signal paths for identifying a priority bus signal path related to a highest level of priority having an active signal asserted thereon;
   first register means for storing an indicia of a level of priority of said associated subsystem;
   activation means for applying an active signal to a signal path having a level of priority identical to a level of priority of said first register indicia, said active signal being applied in response to a second signal from said associated subsystem;
   comparison means for comparing said first register indicia and an output signal from said determination means;
   signal means for providing a first signal to said associated subsystem when said first register indicia and said determination means output signal correspond to a same level of priority; and
   up-date means responsive to signals from said comparison means for incrementing said first register indicia.

10. The arbitration unit of claim 9 wherein said first signal is a GRANT signal granting access by said associated subsystem to said shared resource and said second signal is a REQUEST signal requesting access to said shared resource by said associated subsystem.

11. The arbitration unit of claim 9 wherein said arbitration unit can generate said first signal during consecutive clock cycles of said data processing system.

12. The arbitration unit of claim 10 further comprising initialization means responsive to an initialization signal for storing a predetermined indicia representing a unique subsystem level of priority in said first register means.

13. The arbitration unit of claim 9 wherein a subsystem can have a constant and predetermined level of priority associated therewith.

14. The arbitration unit of claim 9 wherein said update means increments said first register indicia to an indicia representing a next higher level of priority when said first register indicia is less than a highest level of priority associated with an active signal on said priority signal bus.

15. The arbitration unit of claim 14 wherein said update means sets said first register indicia to a lowest priority level when said associated signal means provides a first signal.

16. A method of providing a dynamic and distributed arbitration process for a plurality of data processing subsystems in a synchronous data processing system, said data processing subsystems requiring access to a shared resource, said method comprising the steps of:
   assigning to each of said subsystems a unique level of priority:
   identifying each level of priority with a preselected signal path;
   when a subsystem requires access to said shared resource, applying an active signal by said subsystem requiring access to a signal path associated with a current level of priority of said subsystem requiring access,
   monitoring all signal paths by each subsystem;
   determining when an active signal applied by a subsystem is associated with a level of priority equal to a highest level of priority of applied active signals;
   permitting a subsystem applying an active signal associated with a level of priority equal to said highest level of priority associated with active signals to have access to said shared resource; and
   reassigning a new and unique level of priority to selected subsystems when access to said shared resource has been permitted.

17. The method of providing a dynamic and distributed arbitration process for a plurality of data processing subsystems requiring access to a shared resource of claim 16 wherein said reassigning step includes the step of assigning a lowest priority level to said subsystem previously applying an active signal associated with said highest priority level.

18. The method of providing a dynamic and distributed arbitration process for a plurality of data processing subsystems requiring access to a shared resource of claim 17 wherein said reassigning step further includes the step of incrementing by one each priority level associated with a subsystem having a unique priority level associated therewith that is less than said highest priority level.

19. The method of providing a dynamic and distributed arbitration process for a plurality of data processing subsystems requiring access to a shared resource of claim 18 further comprising the step assigning a unique predetermined level of priority to each subsystem in response to an initialization signal.

20. The method of providing a dynamic and distributed arbitration process for a plurality of data processing subsystems requiring access to a shared resource of claim 18 further comprising the step of initializing said arbitration process by assigning a constant predetermined priority level to at least one of said subsystems.

21. The method of providing a dynamic and distributed arbitration process for a plurality of data processing subsystems requiring access to a shared resource of claim 16 wherein said determining step includes a step of determining when an active signal applied by a said subsystem is associated with said highest priority level during each data processing system timing cycle.

22. An arbitration apparatus for a plurality of processing units having access to a shared resource to determine which processing unit next gains access to said shared resource, comprising:
   a priority signal bus having a plurality of priority signal paths, each said path related to a level of priority
   a plurality of arbitration means, each arbitration means associated with a processing unit and holding an indicia of priority of said associated processing unit;
   means for an arbitration means to assert a selected priority signal path related to a level of priority given by said indicia of priority of said associated processing unit;
   means for granting access to said shared resource to a processing unit identified as having an indicia of priority matching a highest priority of all priority signal paths asserted; and,
   means for increasing said indicia of priority for processing units having lower priority than a processing unit granted access to said shared resource.

23. The apparatus as in claim 22 further comprising:
   means for assigning an arbitrary priority value to a selected processing unit.

24. The apparatus as in claim 23 further comprising:
   means for determining that a processing unit last having access to said shared resource is said selected processing unit having an assigned arbitrary priority value; and,
   means for not increasing the priority value of any processing unit when the last processing unit to have access to said shared resource is said selected processing unit.

25. The apparatus as in claim 22 further comprising:
   said shared resource is a system bus.

26. The apparatus as in claim 22 further comprising:
   at least one of said plurality of processing units is a central processing unit (11, 12).

27. The apparatus as in claim 22 further comprising:
   at least one of said plurality of processing units is a main memory unit (14).

28. The apparatus as in claim 22 further comprising:
   at least one of said plurality of processing units is an input/output unit (15).

29. A data processing system comprising:
   a plurality of processing units;
   at least one shared resource;
   a plurality of arbitration means, each arbitration means associated with a processing unit and exchanging signals therewith, said arbitration means for determining a priority of said associated processing unit;

means for holding an indicia of priority of each processing unit;

a priority signal bus having a signal path for each level of priority available to said processing units, all signal paths being coupled to all arbitration means, wherein each arbitration means applies a priority signal to a signal path related to a level of priority of said associated processing unit when a first signal is applied to an arbitration means by said associated processing unit, each arbitration means including comparator means coupled to said priority signal bus for applying a second signal to said associated processing unit when said arbitration means identifies a highest priority of all priority signals applied to said priority signal bus as corresponding to an indicia of priority of said processing unit; and, up-date means for increasing said indicia of priority for processing units having lower priority than a processing unit granted access to said shared resource.

30. The apparatus as in claim 29 further comprising:
means for assigning a lowest priority to a last processing unit having access to said at least one shared resource.

31. A data processing system comprising:
a plurality of processing units;
at least one shared resource;
a plurality of arbitration means, each arbitration means associated with a processing unit and exchanging signals therewith, said arbitration means for determining a priority of said associated processing unit;
means for holding an indicia of priority of each processing unit;
a priority signal bus having a signal path for each level of priority available to said processing units, all signal paths being coupled to all arbitration means, wherein each arbitration means applies a priority signal to a signal path related to a level of priority of said associated processing unit when a first signal is applied to an arbitration means by said associated processing unit, each arbitration means including comparator means coupled to said priority signal bus for applying a second signal to said associated processing unit when said arbitration means identifies a highest priority of all priority signals applied to said priority signal bus as corresponding to an indicia of priority of said processing unit;
up-date means, responsive to a one of said plurality of processing units having access to said shared resource, for increasing said indicia of priority for processing units having lower priority than a first selected processing unit granted access to said shared resource; and,
means for assigning to at least one second selected processing unit an arbitrary priority level, and not incrementing said indicia of priority of said plurality of processing units after said second selected processing unit has had access to said shared resource.

32. The apparatus as in claim 31 further comprising:
said second selected processing unit is assigned a highest value of priority.

33. The apparatus as in claim 29 or claim 32 further comprising:

said shared resource is a system bus coupling said plurality of processing units, said first signal is a request signal, and said second signal is a grant signal.

34. A data processing system comprising:
a plurality of processing units;
a shared system bus;
a plurality of arbitration means, each arbitration means associated with a processing unit and exchanging signals therewith, said arbitration means for determining a priority of said associated processing unit;
means for holding an indicia of priority of each processing unit;
a priority signal bus having a signal path for each level of priority available to said processing units, all signal paths being coupled to all arbitration means, wherein each arbitration means applies a priority signal to a signal path related to a level of priority of said associated processing unit when a request signal is applied to an arbitration means by said associated processing unit, each arbitration means including comparator means coupled to said priority signal bus for applying a grant signal to said associated processing unit when said arbitration means identifies a highest priority of all priority signals applied to said priority signal bus as corresponding to an indicia of priority of said processing unit;
means, responsive to a one of said processing units last having access to said system bus, for increasing said indicia of priority for processing units having lower priority than a first selected processing unit granted access to said system bus, except not performing the up-date of priority indicia in the event that a second selected processing unit last had access to said system bus; and,
means for assigning to said second selected processing unit an arbitrary priority level.

35. The apparatus as in claims 1 or 9 or 22 or 29 or 31 or 34 further comprising:
said priority levels assigned to said processing units are unique, so that each priority level is had by only one said processing unit.

36. The apparatus as in claims or 9 or 22 or 29 or 31 or 34 further comprising:
means for assigning a lowest priority value to a processing unit last having access to said shared resource in the event that indicia of priority of processing units are increased when said unit last having access to said shared resource releases said shared resource.

37. The apparatus as in claim 22 or claim 34 further comprising:
means for assigning a lowest priority value to a processing unit last having access to said system in the event that indicia of priority are up-dated.

38. A method of operating an arbitration apparatus of the type having a plurality of processing units having access to a shared resource to determine which processing unit next gains access to said shared resource, comprising:
providing a priority signal bus having a plurality of priority signal paths, each said path related to a level of priority;
providing a plurality of arbitration means, each arbitration means associated with a processing unit and holding an indicia of priority of said associated processing unit;

asserting, by an arbitration means, a selected priority signal path related to a level of priority given by said indicia of priority of said associated processing unit;

granting access to said shared resource to a processing unit identified as having an indicia of priority matching a highest priority of all priority signal paths asserted; and, increasing said indicia of priority for processing units having lower priority than a processing unit granted access to said shared resource.

39. The method as in claim 38 further comprising:

assigning an arbitrary priority value to a selected processing unit.

40. The method as in claim 39 further comprising:

determining that a processing unit last having access to said shared resource is said selected processing unit having an assigned arbitrary priority value;

overriding said increasing step to not increase the priority value of any processing unit when the last processing unit to have access to said shared resource is said selected processing unit.

41. A method of operating a data processing system comprising:

providing a plurality of processing units;

providing at least one shared resource;

providing a plurality of arbitration means; each arbitration means associated with a processing unit and exchanging signals therewith;

determining a priority of said associated processing unit by said arbitration means;

holding an indicia of priority of each processing unit;

applying a first signal to an arbitration means by said associated processing unit, applying, in response to said first signal, a priority signal to a signal path related to a level of priority of said associated processing unit, said signal path in a priority signal bus;

applying, in response to said priority signal, a second signal to said associated processing unit when said arbitration means identifies a highest priority of all priority signals applied to said priority signal bus as corresponding to an indicia of priority of said processing unit; and, increasing said indicia of priority for processing units having lower priority than a processing unit granted access to said shared resource.

42. A method of operating a data processing system comprising:

providing a plurality of processing units;

providing at least one shared resource;

providing a plurality of arbitration means, each arbitration means associated with a processing unit and exchanging signals therewith;

determining a priority of said associated processing unit by said arbitration means;

holding an indicia of priority of each processing unit;

applying a first signal to an arbitrative means by said associated processing unit;

applying, in response to said first signal, a priority signal to a signal path related to a level of priority of said associated processing unit, said signal path in a priority signal bus;

applying, in response to said priority signal, a second signal to said associated processing unit when said arbitration means identifies a highest priority of all priority signals applied to said priority signal bus as corresponding to an indicia of priority of said processing unit;

increasing, in response to a one of said plurality of processing units last having access to said shared resource, said indicia of priority for processing units having lower priority than a processing unit granted access to said shared resource; and, assigning to at least one second selected processing unit an arbitrary priority level, and not incrementing said indicia of priority of said plurality of processing unit after said second selected processing unit has had access to said shared resource.

43. A method of operating a data processing system comprising:

providing a plurality of processing units;

providing a shared system bus;

providing a plurality of arbitration means, each arbitration means associated with a processing unit and exchanging signals therewith, determining a priority of said associated processing unit by said arbitration means;

holding an indicia of priority of each processing unit;

applying a request signal to an arbitration means by said associated processing unit, applying, in response to said request signal, a priority signal to a signal path related to a level of priority of said associated processing unit, said signal path in a priority signal bus;

applying, in response to said priority signal, a grant signal to said associated processing unit when said arbitration means identifies a highest priority of all priority signals applied to said priority signal bus as corresponding to an indicia of priority of said processing unit;

increasing, in response to a one of said plurality of processing units last having access to said system bus, said indicia of priority for processing units having lower priority than a processing unit granted access to said shared resource; and, assigning to at least one second selected processing unit an arbitrary priority level, and not incrementing said indicia of priority of said plurality of processing units after said second selected processing unit has had access to said system.

* * * * *